H. M. WHITCOMB.
FRICTION GEAR MECHANISM.
APPLICATION FILED DEC. 20, 1909.
967,279.
Patented Aug. 16, 1910.
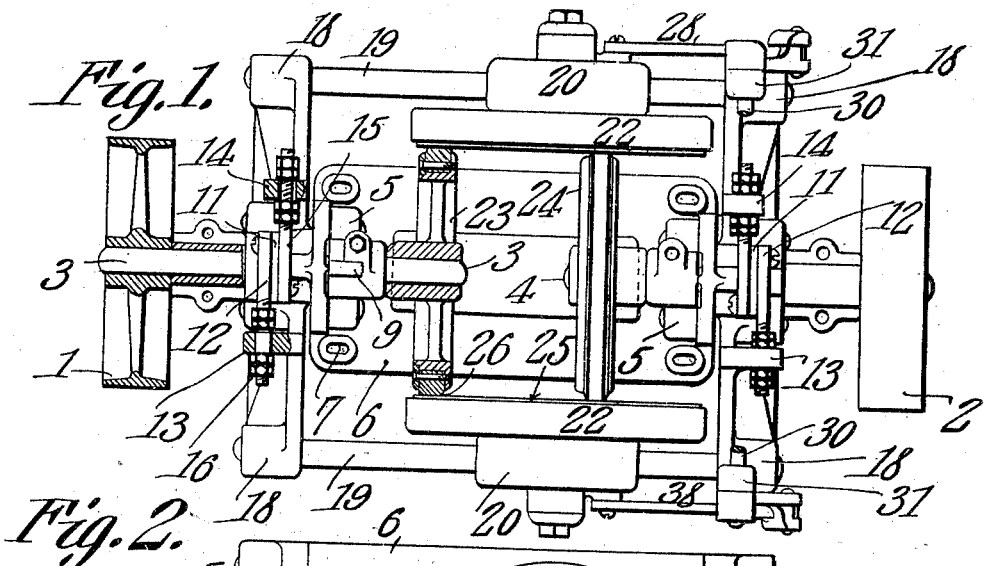
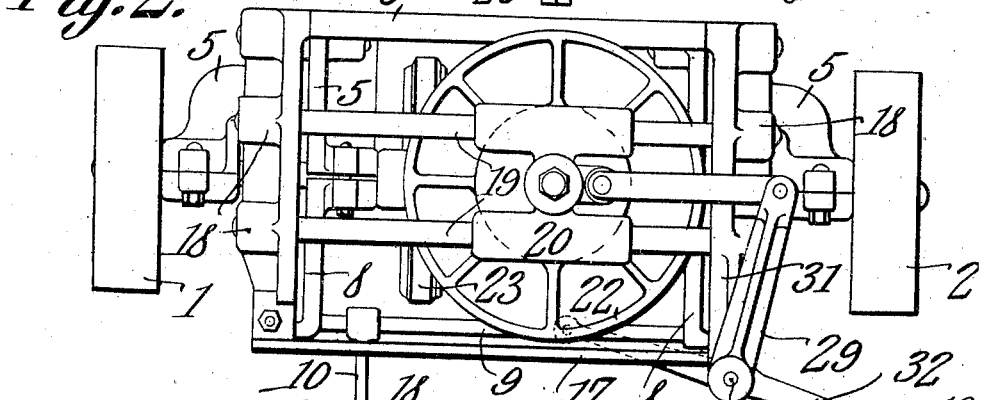
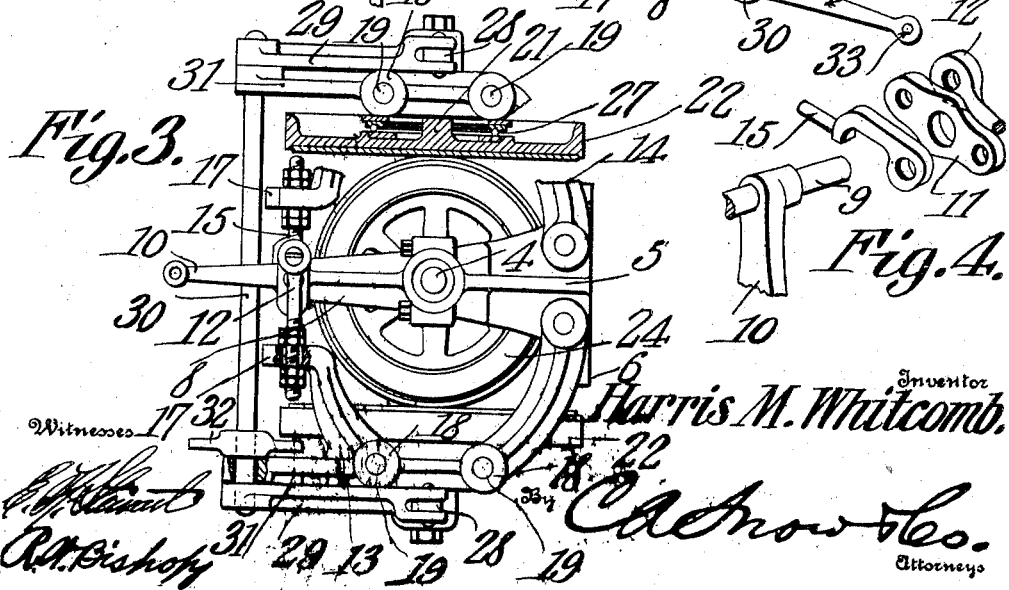

UNITED STATES PATENT OFFICE.

HARRIS MORGAN WHITCOMB, OF ALBANY, WISCONSIN.

FRICTION GEAR MECHANISM.

967,279.  Specification of Letters Patent.  Patented Aug. 16, 1910.

Application filed December 20, 1909. Serial No. 534,029.

*To all whom it may concern:*

Be it known that I, HARRIS MORGAN WHITCOMB, a citizen of the United States, residing at Albany, in the county of Green and State of Wisconsin, have invented a new and useful Friction Gear Mechanism, of which the following is a specification.

This invention relates to friction gearing, and has special reference to means for varying the relative speeds of the driving and driven shafts and means for moving the transmission disks into or out of engagement with the friction pulleys on the driving and driven shafts.

The invention consists in certain novel features of the mechanism illustrated in the accompanying drawings and hereinafter first fully described and then subsequently pointed out in detail in the claims.

In the accompanying drawings, which illustrate the preferred embodiment of the invention, Figure 1 is a front elevation with some of the parts in section. Fig. 2 is a plan view. Fig. 3 is an end view partly broken away and with parts in section. Fig. 4 is a detail view of a part of the mechanism for moving the transmission disks into and out of engagement with the friction pulleys.

Referring to the drawings by reference numerals, 1 and 2 denote respectively the driving and driven band pulleys secured on the ends of longitudinal shafts 3 and 4 which are arranged in axial alinement and supported in bearings provided in the front ends of supporting arms 5 projecting from the base plate or supporting bracket 6 which is provided near its ends with slots 7 through which suitable fastening bolts are inserted to secure the said plate to any convenient fixed support. The supporting arms 5 are arranged in pairs and the inner arms of each pair are extended, as indicated at 8, to provide bearings in their front extremities for a rock shaft 9 equipped with an operating handle or lever 10. Upon the ends of the said rock shaft are provided crank disks 11 to which are pivotally secured the upper ends of eye bolts 12, the lower ends of which play in and are secured to the front slotted ends of the curved arms or brackets 13, the rear ends of which are fulcrumed upon the outer supporting arms 5, as shown most clearly in Fig. 3. Similar brackets or arms 14 are provided above the brackets 13 with their rear ends fulcrumed to the supporting arms 5 and their front slotted ends engaging eye bolts 15, the lower ends of which are pivotally attached to the crank or cam disks 11 below the rock shaft 9, it being understood, of course, that the upper ends of the eye bolts 12 are disposed above the rock shaft 9. Suitable locking nuts 16 are provided upon the ends of the eye bolts above and below the respective brackets or supporting arms so as to secure the brackets to the eye bolts while the ends of the arms are longitudinally slotted in order that the motion of the crank disk may be transmitted to the arms or brackets through the eye bolts and binding and consequent breaking of the eye bolts or brackets will be prevented.

It will be readily seen that the brackets 13 and 14 which are disposed on opposite sides of the driving and driven shafts may be made to approach or recede from each other by merely oscillating the rock shaft 9, and consequently the transmission disks which are supported from the said brackets will be caused to move to or from the friction pulleys which are secured upon the inner ends of the driving and driven shafts. It is desirable to have the brackets at the opposite ends of the apparatus move uniformly; and, while the rock shaft and the crank connections of the eye bolts may be sufficient to secure this result, in order to further assure the same I provide connecting bars 17 which have their opposite ends secured to the front ends of the brackets at the opposite ends of the machine, so that the two brackets 14 will be caused to move simultaneously at the same speed and in the same direction and the two brackets 13 will be likewise caused to move simultaneously, notwtihstanding any variation in the eye bolt connections due to wear or inaccuracy in the adjustment of the locking nuts.

The brackets or supporting arms 13 and 14 are provided at points between the ends thereof and near the centers of the same with eyes 18, in which are secured the ends of guide rods 19, and upon the said rods 19 are slidably mounted boxes 20 in which are journaled central stubs or pintles 21 extending from the transmission disks 22 which are adapted to bear against the peripheries of the friction pulleys 23 and 24 secured, respectively, upon the inner ends of the driving shaft 3 and the driven shaft 4. The faces of the transmission disks 22 and the peripheries of the friction pulleys are coated or otherwise provided with fiber or other friction creating material, as indicated at 25 and 26, and anti-friction bearings 27 are provided between the transmission disk 22 and the blocks 20 by which the said disks are supported in order that the power lost in transmission will be reduced to a minimum. The blocks 20 are connected by links 28 with the inner ends of lever arms 29 which are secured to the upper and lower ends respectively of a vertically disposed rock shaft 30 mounted in forwardly projecting extensions 31 of the brackets 13 and 14, respectively, so that the movement of the said rock shaft 30 will be transmitted simultaneously to the links 28 at the top and bottom of the apparatus. In order to impart the necessary movement to the rock shaft 30 a cross head or double lever 32 is secured upon the rock shaft at a convenient point of the same and the said lever is provided with suitable eyes or rings 33 at its ends to which may be attached a suitable chain or other operating device in order that the device may be readily manipulated.

It is thought that the operation of the mechanism and the advantages of the same will be readily appreciated from the foregoing description, taken in connection with the accompanying drawings. Power is imparted to the driving shaft 3 through the band pulley 1 from any convenient source and the friction pulley 23 is thereby set in motion. This pulley, being in engagement with the transmission disks 22, will rotate the said disks and they in turn will set in motion the friction pulley 24 and, consequently, the driven shaft will be rotated and the band pulley 2 thereby caused to transmit motion to the machinery to be operated, as will be readily understood. Inasmuch as the driving and driven shafts are mounted in fixed bearings and the friction pulleys 23 and 24 are secured rigidly to the ends of the said shafts, there will be no disturbance of the relation of the said shafts to the motor nor to the machinery to be operated, by any adjustment of the transmission mechanism. The relative speeds of the driving and driven shafts will be determined by shifting the transmission disks 22 so as to bring the centers of the said disks nearer to either of the friction pulleys accordingly as it may be desired to increase or reduce the speed of the driven shaft relatively to the speed of the driving shaft, and in order to accomplish this adjustment of the transmission disks, the lever 32 is moved to one side or the other so as to cause the boxes 20 to move upon the rods 19 and thereby adjust the transmission disks to the desired position. Should it be desired to stop the driven shaft without arresting the movement of the motor, the lever 10 is shifted so as to move the brackets or supporting arms 13 and 14 apart, thereby carrying the rods 19 away from the driving and driven shafts and consequently moving the transmission disks from contact with the friction pulleys. A very slight movement will be sufficient to take the transmission disks out of contact with the friction pulleys or to bring them into such engagement and consequently the desired adjustment can be very quickly accomplished. In order to accommodate this movement the outer ends of the said brackets as well as the extensions 31 of the same are slotted to permit the movement upon the rock shaft 30 and the eye bolts 12 and 15 and the inequalities or inaccuracies of the engagement between the friction surfaces may be readily compensated by adjusting the locking nuts 16, as will be readily understood.

The device is extremely simple in its arrangement and construction of its parts, may be easily adjusted and will be found efficient for the purpose for which it is intended.

Having thus described my invention, what I claim is:

1. The combination of a driving shaft, a driven shaft mounted in axial alinement therewith, friction pulleys on the inner ends of the said shafts, transmission disks adapted to engage the said friction pulleys, and means for adjusting the said transmission disks edgewise across and laterally from and toward said friction pulleys.

2. The combination of a driving shaft, a driven shaft in axial alinement therewith, friction pulleys on the inner ends of said shafts, transmission disks adapted to engage the said friction pulleys, pivoted brackets supporting said disks, a rock shaft, and connections between the said rock shaft and brackets whereby the oscillation of the rock shaft will swing the brackets and cause the transmission disks to move from or toward the peripheries of the friction pulleys.

3. The combination of a driving shaft, a driven shaft mounted in axial alinement therewith, guide rods parallel with said shafts, friction pulleys on the inner ends of said shafts, a transmission disk, a bearing therefor slidably mounted on said guide rods adjacent to the friction pulleys, a rock shaft, a lever carried by said rock shaft, a link connecting the lever with the bearing, and means for moving said guide rods laterally from and toward said pulleys.

4. The combination of a suitable support, a driving shaft having fixed bearings therein, a driven shaft having fixed bearings in the support in axial alinement with the driving shaft, friction pulleys on the inner ends of said shafts, brackets pivoted on the support, a rod connecting the brackets, a box sliding thereon, a transmission disk carried by the box and adapted to engage the friction pulleys, means for swinging the brackets and rod, a rock shaft mounted on one of the brackets, a lever projecting from said rock shaft, and a link connecting the said lever with the box.

5. The combination of a support, a driving shaft therein, a driven shaft mounted in the support in axial alinement with the driving shaft, friction pulleys on the inner ends of the said shafts, brackets pivoted on the support and at the ends of the same and extending above and below the driving and driven shafts, transmission disks carried by said brackets, and means connecting the free ends of the said brackets to move the same in opposite directions and thereby cause the transmission disks to engage or be released from the friction pulleys.

6. The combination of a support, a driving shaft therein, a driven shaft mounted in the support in axial alinement with the driving shaft, friction pulleys on the inner ends of the said shafts, brackets pivoted on the support at the ends of the same and extending above and below the driving and driven shafts, transmission disks carried by said brackets, a rock shaft disposed between the ends of the said brackets, crank disks on the ends of the said rock shaft, connections between the said crank disks and the ends of the brackets, and means for operating the said rock shaft.

7. The combination of a support, driving and driven shafts journaled therein, contiguous friction pulleys mounted on said shafts, brackets pivoted at one end to the rear of the support and curving over and under said shafts and having extensions, guides on the brackets above and below said shafts, boxes sliding on said guides, means for approximating or separating the free ends of the brackets, a rock shaft loosely mounted in said extensions, a hand lever and lever arms on this rock shaft, links connecting the arms with said boxes, and transmission disks journaled in the boxes.

8. The combination of a support, alined driving and driven shafts journaled therein, contiguous friction pulleys mounted on said shafts, brackets in pairs pivoted at one end to the rear of the support and curving over and under said shafts and having extensions, guides connecting the brackets and standing above and below said shafts, boxes sliding on said guides, means for approximating or separating the free ends of the brackets simultaneously in pairs, a rock shaft loosely mounted in said extensions, a hand lever and lever arms on this rock shaft, links connecting the arms with said boxes above and below said extensions, and transmission disks journaled in the boxes.

9. The combination of a support, axially alined friction pulleys mounted therein, brackets pivoted at one end to the support and slotted at their other ends, eyebolts engaging the slots, crank disks engaging the eyes of the bolts, means for turning the disks to separate or approximate said slotted ends, and transmission disks carried by said brackets above and below said pulleys.

10. The combination of a support, axially alined friction pulleys mounted therein, brackets pivoted at one end to the support and slotted at their other ends, eyebolts engaging the slots, crank disks engaging the eyes of the bolts, means for turning the disks to separate or approximate said slotted ends, guides carried by said brackets above and below said pulleys and extending beyond them parallel with their axes, boxes movable longitudinally on the guides, transmission disks carried by the boxes, and means for moving the latter simultaneously to adjust the disks edgewise independent of their adjustment as the brackets are moved.

In testimony that I claim the foregoing as my own, I have hereto affixed my signature in the presence of two witnesses.

HARRIS MORGAN WHITCOMB.

Witnesses:
  CHAS. A. FRENCH,
  J. D. AYRES.